(12) United States Patent
Razavi et al.

(10) Patent No.: US 7,037,580 B2
(45) Date of Patent: May 2, 2006

(54) PATTERN ADHESIVE SEALING FILMS AND MATS FOR MULTI-WELL PLATES

(76) Inventors: Ali Razavi, c/o Micron Coating Inc., Boulevard Business Park, Unit 4C, 1200 Southwest Blvd., Vineland, NJ (US) 08360; Donald W. Bayer, 109 Huntington Dr., Hammonton, NJ (US) 08037; James G. Finneran, 636 Jefferson Ave., Vineland, NJ (US) 08360

( * ) Notice: Subject to any disclaimer, the term of this patent is extended or adjusted under 35 U.S.C. 154(b) by 196 days.

(21) Appl. No.: 10/253,593

(22) Filed: Sep. 25, 2002

(65) Prior Publication Data

US 2003/0077440 A1    Apr. 24, 2003

Related U.S. Application Data

(60) Provisional application No. 60/324,271, filed on Sep. 25, 2001.

(51) Int. Cl.
*B32B 7/12*     (2006.01)
*B32B 15/04*    (2006.01)

(52) U.S. Cl. ............... 428/343; 428/354; 422/99; 422/102

(58) Field of Classification Search ............... 428/343, 428/354, 915, 916; 422/99, 102
See application file for complete search history.

(56) References Cited

U.S. PATENT DOCUMENTS

| | | | |
|---|---|---|---|
| 2002/0039545 A1* | 4/2002 | Hall et al. | 422/102 |
| 2002/0103352 A1* | 8/2002 | Sudor | 536/23.1 |
| 2003/0077207 A1* | 4/2003 | Tyndorf et al. | 422/102 |
| 2003/0077440 A1* | 4/2003 | Razavi | 428/343 |

* cited by examiner

*Primary Examiner*—Daniel Zirker
(74) *Attorney, Agent, or Firm*—Birch, Stewart, Kolasch & Birch, LLP

(57) ABSTRACT

An adhesive sealing film for a multi-well plate, said sealing film comprising a polymeric film coated on one side with a pattern formed from adhesive, wherein the adhesive pattern does not cover areas of the sealing film that correspond to the wells in said multi-well plate.

11 Claims, 3 Drawing Sheets

PATTERN ADHESIVE SEALING FILMS AND MATS FOR MULTI-WELL PLATES

This application claims priority on provisional Application No. 60/324,271 filed on Sep. 25, 2001, the entire contents of which are hereby incorporated by reference.

SUMMARY OF INVENTION

The present invention relates to sealing films and mats for multi-well plates with adhesive backing present in pattern format, which provides adhesive-free areas that are in contact with the well content where seal films and mats adhere to the plate. This is achieved by exactly matching of pattern adhesive array on the sealing materials with array of multi-well, which is commercially available in 6/12/24/48/96/384/1536 well formats. Furthermore, optimum chemical barrier sealing products in single-layered, multi-layered, or roll format products can be obtained by using fluoropolymeric film materials covered by specific adhesive in desired pattern for diverse sealing applications. Also, tamper evidence sealing films, mats, and laminates with Aluminum foil and others, which are produced by either coating or premixing of leizer effect dye with desired sealing materials, would reveal any discontinuity on sealing protection under UV or visible light. The combination of tamper evidence and pattern adhesive on a single side or both sides of the sealing material provides multi-purpose sealing products which are not commercially available at the present time.

BACKGROUND OF THE INVENTION

Multi-well plates are used extensively in variety of laboratory and pharmaceutical settings, including but not limited to:

Experimental assays
Sorbent assays
High-throughput screening (HTS)
Combinatorial chemistry
Drug discovery
Drug metabolism
Liquid chromatography with tandem
mass spectrometry (LC-MS-MS)
Cell culture
Tissue culture
PCR
DNA These plates are commercially available in the 6/12/24/48/96/384/1536 well designs. The foot print dimensions of these plates remain constant with the only variation in design being the number of the wells per plate. In addition, there are variety of sealing films with adhesive backing that are commercially available for sealing the multi-well surfaces for different applications. These sealing films can be heat sealed or adhered to the surface of the plate by pressure application. These current methods of sealing multi-well plates with adhesive backing sealing films, which mostly consist of aluminum foil, polyester, polypropylene and others, are available in single-layer, multi-layer or roll form. The current methods of sealing with adhesive backed films have many significant drawbacks including adhesive contact with content of the wells, contamination of needles with adhesive when penetrating through sealing films to access the contents of the wells, limited chemical resistance to many solvent based solutions in the well content including DMSO, leaching of plasticizer in the sealing films by well content, and condensation in the well area during thermo-bonding of sealing film to plate. Alternatively, a seal may be achieved by placing flexible rubber mats with raised dimples on the surface in an array which matches exactly the array of the wells. Each dimple is sized and shaped to fit firmly into the wells. This mat design with dimples has limited usage due to the constraint of well size and geometry related to plate design. In addition, mat design with dimples matching the plate becomes extremely difficult when mat design requires more than 96 wells per plate. As a further alternative, sealing caps consisting of individual circular cylinder walled caps with piercable lids can be used which fit into the internal bore of each plate. However, these caps are time consuming to apply and have limited usage with refinement of well design. It is therefore an objective of the present invention to provide sealing solutions for multi-well plate in single-layer, multi-layer, or roll format which overcome the above disadvantages.

DETAILED DESCRIPTION OF INVENTION

Figure 1:
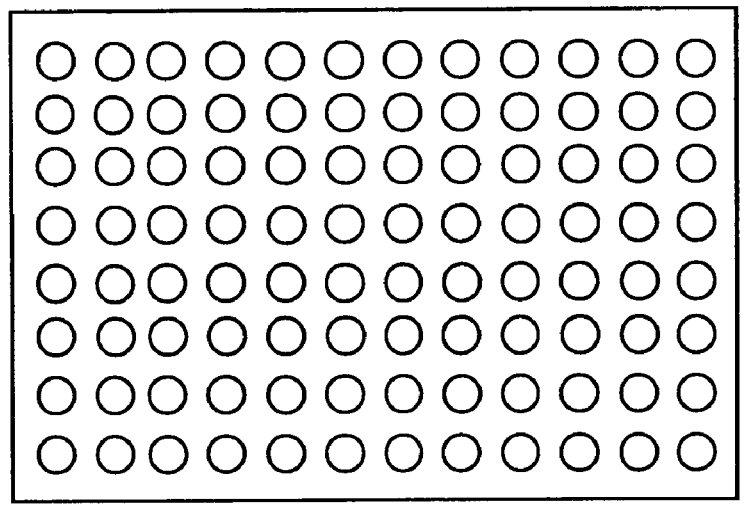
FIG. 1 shows a 96-well plate.
Figure 2:
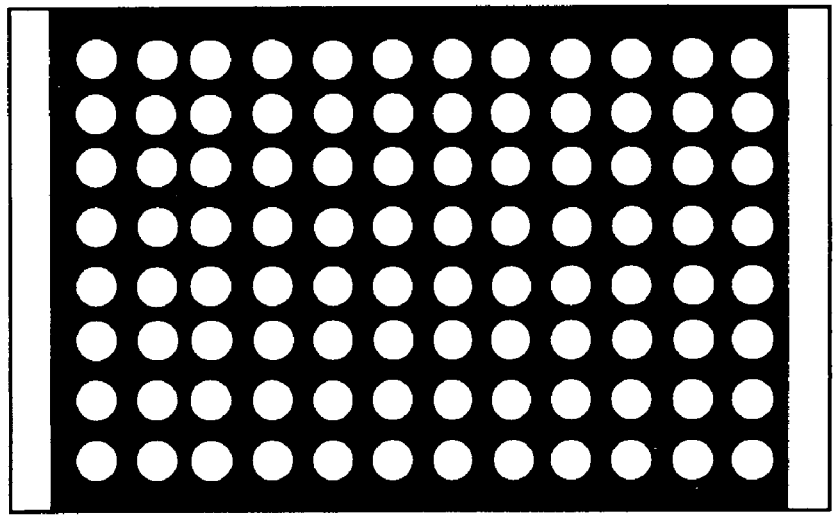
FIG. 2 shows a sealing film configured to be used with the 96-well plate of FIG. 1.
Figure 3:
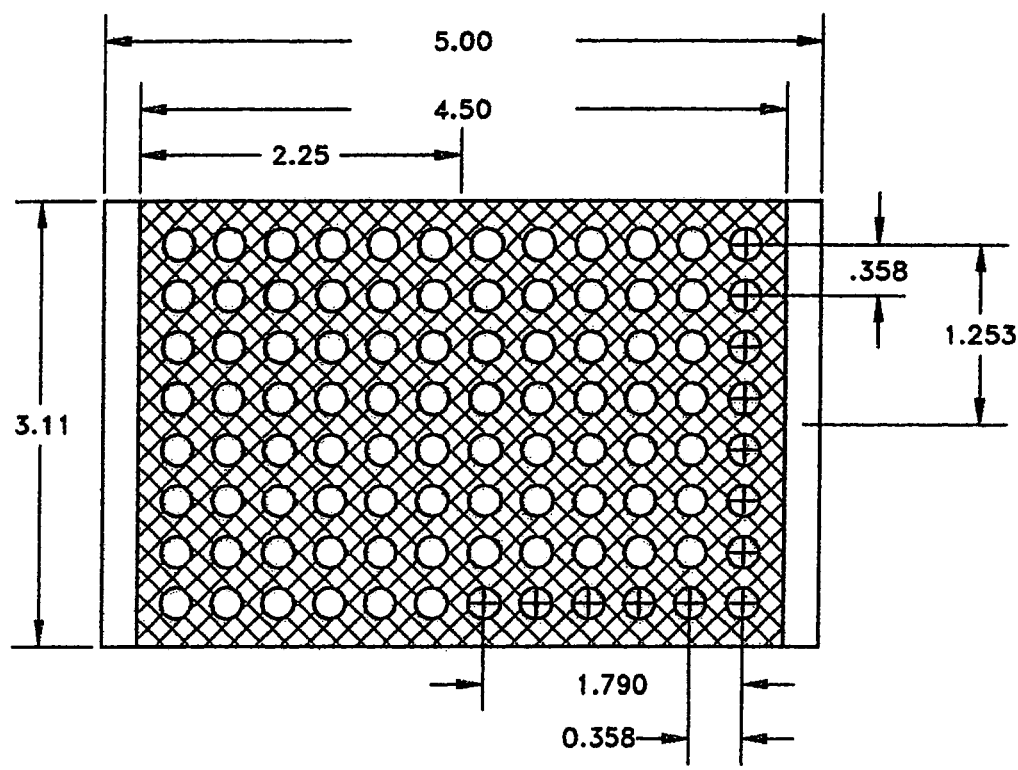
FIG. 3 shows a sealing film having adhesive-free areas.

Multi-well plates are commercially available with 6/12/24/48/96/384/1536 well designs. The foot print dimension of these plates remains constant, with the only variation design being the number of wells per plate. A 96 multi-well plate is one popular standard which comes with 8×12 array of wells. The well's cross-sectional area could be circular, rectangular, or any specific geometry required. FIG. 1 is schematic of the front view area of a typical 96 well plate, with circular 8×12 wells located in specific arrays. Each circle is indicative of the diameter of each well arranged in specific areas with the plate having a straight or chanferd corner. The present invention is suitable for any such commercially available plate. For example, the dimensions of one such commercially available plate are a length of 4.750 cm, a width of 3.110 cm, with 0.358 cm being measured from the center of one well to the center of the adjacent well. However, the invention is not limited to any particular dimensions being present on the plate. The purpose of this invention is to duplicate exactly the pattern described in FIG. 1, or any other design by first selecting optimum films or mat materials for specific sealing applications, treating candidate materials in order to accept any specific adhesive, and then coating the film and mat materials with adhesive in pattern format which is given as an example in FIG. 1. As a result of the above procedure, sealing products will be available which are adhesive free on specific target areas of contact to multi-plate well surface. FIG. 2 is schematic of a sealing film or mat based on the defined procedure. Adhesive-free circles are exactly identical to micro-plate's wells. The rest of the areas including the periphery of the wells provide sealing surfaces between films or mats on multi-well plates. In order to facilitate the matching of adhesive-free areas of sealing films with surface areas of the wells located on the plates, extra adhesive-free areas are provided on both sides of sealing products. FIG. 3 represents this particular design. In addition, the adhesive can be colored without losing its property for additional contrast and alignment purposes. Fluoropolymers and metallized Fluoropolymers offer unique barrier properties against most of organic solvents and chemicals available in the market including but not limited to DMSO, DME, THF, and TFE. Combination of chemical and solvent barrier properties, and low vapor permeability of Fluoropolymers make this material uniquely defined for sealing application for low and high temperature usages. Fluoropolymeric film materials with adhesives in pattern format would provide new sealing products with all the benefits of barrier properties and high temperature stability of mentioned films. Furthermore, elastomeric materials like silicone rubber, butyl rubber, and others are frequently molded in mat form for sealing applications. These elastomeric materials either in single-layer or laminated with Fluoropolymeric film materials are useful sealing solutions for repeated extraction application. Application of adhesive in pattern format to treated elastomeric materials in single or laminated with Fluoropolymers would eliminate the need of dimples in sealing. This in turn would extend the application of elastomeric materials beyond 96 format with ease of application and adhesive-free contact area to well content. There are no commercial sealing products in the market which provide tamper evidence protection. Aluminum seals with central target area exposed are being commercially used for pharmaceutical packaging by sealing rubber stoppers against glass vials by crimping Aluminum seal around their necks. This sealing method provides an open area on the top which provides access to vial content to rubber stopper. The tamper-evidence seals with plastic button protecting the injection site are comercially available through West Company and others. In order to access injection site the plastic button has to be removed manually. Leiser effect is a known phenomenon which is being applied in tamper evidence protection in security field. This effect is being used by adding specialty dye materials to original resin before processing to final film products. Alternatively, the mentioned dye could be part of the chemistry which can be laid down as a coating on the surface of seal film materials. The prepared substrate materials based on Leiser effect would reveal the existence of any cuts, holes, or any discontinuity through film thickness, when viewed under UV light. The illuminated seal under UV light provides distinguishable optical contrast around any kind of discontinuity on the seal for tamper evidence application. Lamination of film materials with tamper evidence properties onto the Aluminum foil, or other materials would provide multi layered laminated products with central target area exposed provides alternative sealing products for pharmaceutical packaging. The major advantage of this tamper evidence laminate compared to flip-off technology is related to cost and elimination of manual removal of tamper evident button. This new product with tamper evident sealing film can be punctured directly through the film through central target area exposed in order to access the solution in the vial. This product is auto-clavable as well.

EXAMPLE 1

2 mil and 5 mil treated Fluoropolymers, Polypropelyn, Polyester, Barex films, including 20 mil treated EPDM, Silicone Rubber, Butyl Rubber elastomeric materials were used as representatives of different materials for pattern adhesive coating. Water and solvent based acrylic plus UV-curable pressure sensitive adhesives are used for laying down 96/384/1536 pattern formats on the above materials. Furthermore, the above adhesives were dyed with blue, red, and other colors to provide more contrast to pattern adhesive arrays to match with the plate format. Both water and solvent based pressure sensitive adhesives in virgin and dyed state provided cured adhesives with high tack value between 450–700 gram/sq.cm on pattern format. The UV-cured adhesive did not deliver the tack required for this application plus property of adhesives were severely damaged over time. All the sealing films and mats prepared this way adhered to all commercially available multi-well plates regardless of materials, or temperature cycles required for certain applications. Also, there was not any trace of adhesive left on the surface of the plate after removing the sealing film from the plate.

EXAMPLE 2

The same materials which were covered in example 1 are subjected to heat-activated adhesive in defined pattern format. In this case, water and solvent based heat-activated adhesives in virgin and dyed formula were used for the coating of pattern format. The pattern adhesive sealing films and mats with heat-activated pattern adhesive were laminated to commercial plate with Platinum press which is heated up 300–350° F. under pressure of 20–50 psi. Both water and solvent based heat activated adhesive laminated well to variety of commercial multi-well plates available.

EXAMPLE 3

There are a variety of top coat materials available commercially. In addition, visible and UV dyes are produced in a variety of chemistry. The solubility of UV or visible dyes in any particular resin or coating is optimized based on solubility limit of dye materials within the desired matrix. Water and solvent based acrylic materials were selected for mixing with visible and UV dyes in order to provide top coat for tamper-evident property. The optimum dissolved weight percent of dyes in acrylic based materials were between 0.5%–1% grams. This formulated top coat can be applied as a continuous or pattern format on treated film materials including but not limited to Fluoropolymers, Polyester, and Polypropylene. Cured acrylic top coat was intentionally cut and punctured with fine needles. The damaged films were illuminated by UV light operating at 370–380 nanometer wave length. The damaged areas were glowing under the imposed light with clear indication of discontinuety. The same coating was applied by mixing laser dye material to base acrylic coating. The damaged area viewed by laser operating at red or green wave length revealed the existence of tampered areas. There are two options for creating seal films with tamper evidence properties: either pattern adhesive and tamper evidence coating are being coated on one side, or tamper evidence(top coat), and pattern adhesive are being applied on the opposite sides of the sealing film. In the first case, heat activated, pressure sensitive adhesive were applied in pattern format on top of the top coat which has already been explained. Upon adhering these sealing films to multi-well plate, there was no sign of degradation on tack and adhesive properties used in providing sealing films with tamper evidence combined with pattern adhesive properties. In the second case, 2 mil thick Fluoropolymers, Ployesters, Polypropylene were treated on both sides. The top acrylic coating mixed with UV dye were applied first on the outside of the films and then cured. The other side of the same films was coated with heat-activated, and some others with water based pressure sensitive adhesives in pattern format. In the second procedure, the sealing film is designed in such a way that the tamper-evidence coating is on one side and pattern adhesive is coated on the other side. This example provides a variety of design routes available to produce sealing films with multiple functionalities.

EXAMPLE 4

Aluminum foil with desired thickness was coated continuously with heat activated adhesive and then cured. This prepared composite foil then was die-cut with circular die in order to provide open central target area necessary for accessing the vial content. 2 mil Polyester films were treated on one side and continuously coated with tamper evidence acrylic material. Upon lamination of heat activated adhesive side of Aluminum foil with central target area open with the tamper evidence coating side on Polyester film, would provide tamper evidence structure alternative to flip-off technology. These laminates then can be further die cut in order to provide Aluminum shell materials combined with Polyester sealing films equipped with tamper evidence properties. Then there is no need for mechanical removal instead UV inspection of the seal integrity followed by through seal film injection would provide access to the content of the vial.

What is claimed is:

1. A sealing product for a multi-well plate made by
   a) selecting a sealing material of an optimum film or mat material for a specific sealing application;
   b) treating said sealing material selected from the group consisting of; and
   c) coating said sealing material with an adhesive in a pattern format of a multi-well plate, wherein the adhesive covers substantially all of the surface area of the sealing material that contacts the multi-well plate but does not cover the well area of the multi-well plate and, wherein said sealing product can be adhered to a multi-well plate without contacting wells of the multi-well plate, using an adhesive in a pattern format and comprises a sealing material selected from elastomeric materials, fluoropolymers, mixtures of elastomeric materials and fluoropolymers, polyethylene, polypropylene, polyesters or mixtures thereof, or metallic foils, which are manufactured into a desired shape and thickness.

2. A sealing product of claim 1, further comprising a sealing substrate, wherein the sealing material is a metallic foil.

3. The sealing substrate of claim 2, wherein the metallic foil is a mix with a solution cast fluoropolymer.

4. The sealing product of claim 1, wherein the pattern format is in the form of a 6, 12, 24, 48, 96, 384 or 1536 well multi-well plate.

5. The sealing product of claim 4, wherein wells are in the form of circles, squares or rectangles.

6. The sealing products of claim 1, wherein the adhesive is in a colored pattern.

7. The sealing products of claim 1, wherein the adhesive is a heat-activated adhesive, a solvent-based adhesive or a UV curable adhesive.

8. A fluoropolymeric-based sealing product, which comprises the sealing product of claim 1, as a chemical barrier against organic solvents selected from the group consisting of DMSO, DME, THF, TFE and mixes thereof.

9. A dimple-free resealable sealing product comprising the sealing product of claim 1, wherein the elastomeric material is silicone rubber or butyl rubber or a mix thereof.

10. A dimple-free resealable sealing product comprising the sealing product of claim 1, wherein the sealing material is an elastomeric-fluoropolymeric laminate.

11. A sealing product of claim 1, wherein the sealing material is selected from the group consisting of polyethylene, polypropylene, polyester or a mixture thereof.

* * * * *